United States Patent [19]
Mansani et al.

[11] Patent Number: 5,661,769
[45] Date of Patent: Aug. 26, 1997

[54] DEPRESSURISING SYSTEM FOR PLANTS OPERATING WITH PRESSURIZED STEAM

[75] Inventors: Luigi Mansani; Gianfranco Saiu; Alessandro Alemberti, all of Genova, Italy

[73] Assignee: Finmeccania S.p.A. Azienda Ansaldo, Genova, Italy

[21] Appl. No.: 619,646

[22] PCT Filed: Sep. 21, 1994

[86] PCT No.: PCT/EP94/03162

§ 371 Date: Jun. 9, 1996

§ 102(e) Date: Jun. 9, 1996

[87] PCT Pub. No.: WO95/09425

PCT Pub. Date: Apr. 6, 1995

[30] Foreign Application Priority Data

Sep. 29, 1993 [IT] Italy ............... MI93A02070 U

[51] Int. Cl.$^6$ .................................................. G21C 9/004
[52] U.S. Cl. ................................... 376/283; 376/407
[58] Field of Search ............................... 376/282, 283, 376/299, 372, 392, 407

[56] References Cited

U.S. PATENT DOCUMENTS

| | | | |
|---|---|---|---|
| 4,444,246 | 4/1984 | Reinsch | 376/407 |
| 5,262,091 | 11/1993 | Narabayashi et al. | 376/407 |

FOREIGN PATENT DOCUMENTS 2682214  4/1993  France.

OTHER PUBLICATIONS

Mori, Tsugio, "Cooling System at Nuclear Reactor Isolation", Patent Abstracts of Japan, Apr. 17, 1992.

Murakami, Hiroshi, "Condensed Water Discharging Device", Patents Abstracts of Japan Jan. 8, 1987.

Database WPI, Derwent Publications, Week 8923, AN 89-167912 & HU,A, 48045, Abstract Apr. 28, 1989.

*Primary Examiner*—Daniel D. Wasil
*Attorney, Agent, or Firm*—Sofer & Haroun, LLP

[57] ABSTRACT

A depressurizing system (1) for depressurizing plants, operating with pressurized steam and including a steam head (16), by injection of cold water under gravity from a reservoir (2) located at a higher level than the pressurized plant and connected thereto by a delivery duct (24) which forms a syphon (24a, 24b, 24c) and which is connected to the narrow section (10) of an ejector (6) into which steam flows in the event of an incident, the steam being drawn from a condenser (7) located downstream of the ejector (6), causing a drop in pressure which draws cold water from the tank (2) through the syphon which is thus overcome, enabling cold water to be injected into the pressurized plant.

6 Claims, 3 Drawing Sheets

DEPRESSURISING SYSTEM FOR PLANTS OPERATING WITH PRESSURIZED STEAM

The present invention relates to a system for depressurising plants operating with pressurised steam.

The system is of the type in which cold water, contained in a reservoir at a higher level than the pressurised plant, is injected under gravity.

It is known that this type of system is used to ensure the maximum safety in the case of an incident in a pressurised plant which requires the immediate depressurising of the plant itself.

A typical application is in the field of water-cooled nuclear reactors where research into more advanced safety measures is a fundamental part of any development programmed.

The depressurisation consists of the injection into the pressurised plant of a large quantity of cold water which condenses the steam present and lowers the temperature with a consequent drop in the internal pressure.

After this depressurisation it is then possible to activate further systems for alleviating the incident.

The depressurising system must, however, activate without any possibility of failure.

Such failure could have devastating effects in that the further alleviating systems would be ineffective.

Depressurising systems which operate by injection of a coolant liquid under gravity are known.

Such injection is, however, initiated through the use of automatic logic enabling signals from a control systems or manually by operators. This then requires the intervention of suitable actuator members such as valves.

The need for an enabling signal, itself, however, introduces a probability of failure.

Moreover the activation of the injection requires the presence of external energy sources. This also introduces a failure probability.

Finally the actuators also have a failure probability.

For these reasons, recent design developments in the nuclear field have been directed to the devising of passive safety systems.

Such systems are able to carry out the functions assigned to them only on the basis of physical laws by virtue of adequate mechanical-functional design.

The technical problem at the basis of the present invention is that of providing a depressurising system for pressurised plants which overcomes the above problems explained in the prior art, while satisfying this requirement.

This problem is solved according to the invention by a depressurising system for plants operating with pressurised steam and including a steam head, by injection of cold water under gravity from a reservoir located at a position higher than the pressurised plant and having a delivery duct for delivery to the pressurised plant, characterised in that it includes an ejector which has an inlet section, an outlet section and a narrow section, a condenser which has an inlet and an outlet, a first connector duct which puts the reservoir in communication with the steam head, a second connector duct which puts the inlet section of the ejector in communication with the steam head, a third connector duct which puts the outlet section in communication with the inlet of the condenser, a first injector duct which puts the outlet of the condenser in communication with the pressurised plant, and in that the delivery duct forms a syphon, the reservoir communicating with the pressurised plant through the delivery duct, and through the narrow section of the ejector.

The main advantage of the present invention lies in the fact that it operates passively, relying solely on physical laws by virtue solely of its structural characteristics.

A further advantage is due to the fact that the realisation of the invention requires the assembly of components which are simple to design.

A further advantage of the present invention lies in the fact that it is adapted to a wide range of pressurised plant including any type of pressurised water or boiling water nuclear reactor.

Further characteristics and advantages of the invention will become clearer from the description of one embodiment of the depressurising system for pressurised plants applied to a pressurised light-water nuclear reactor made below with reference to the appended drawings, given by way of non-limitative example.

Figure 1:
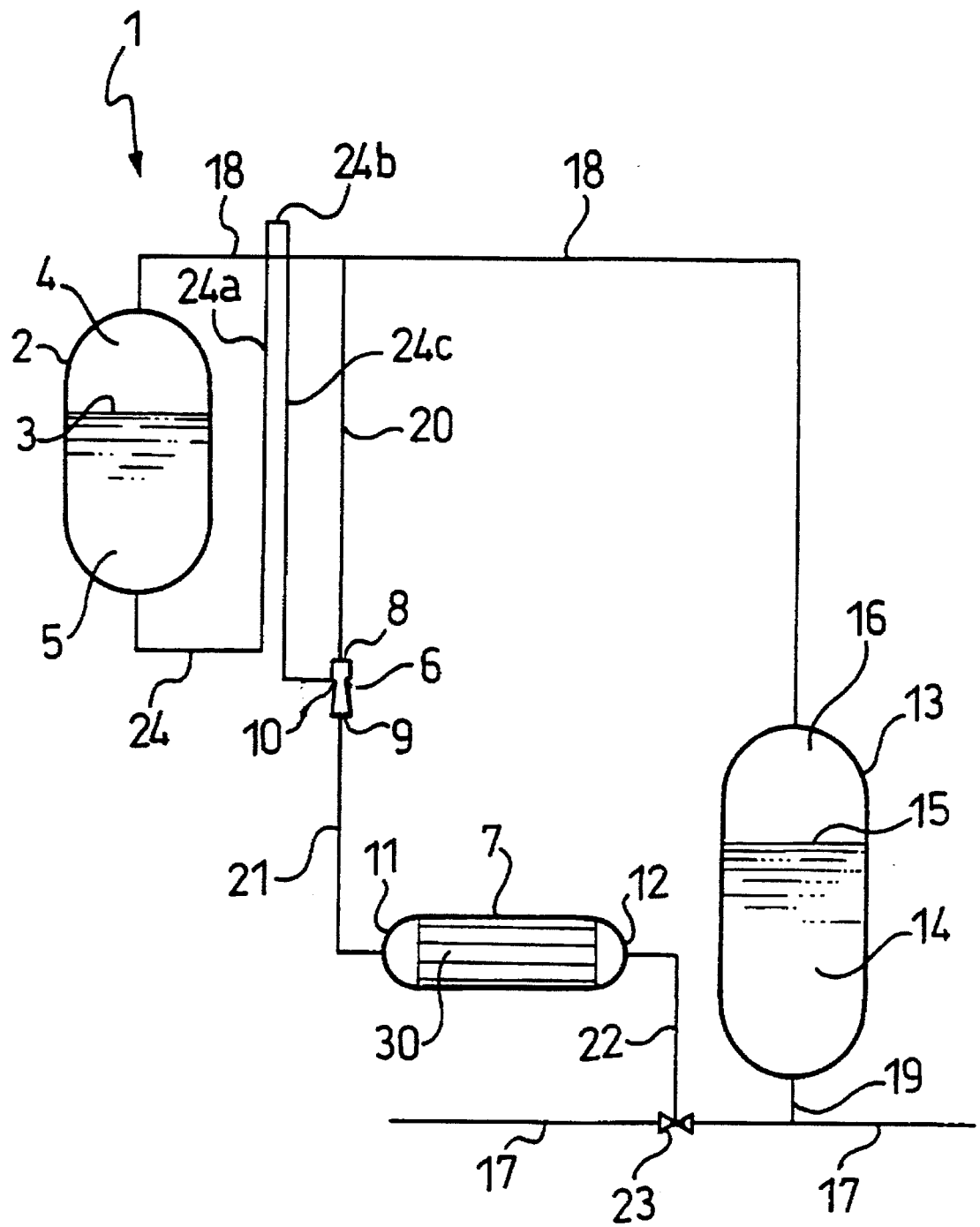
FIG. 1 shows schematically an embodiment of the depressurising system for pressurised plants, in accordance with the invention.

In the drawings, a depressurising system for pressurised plants is generally indicated 1.

The pressurised plant is constituted, in this embodiment, by a nuclear reactor which is not shown in its entirety although components which interact with the depressurising system 1 are shown.

The system 1 includes a tank 2 filled to a level 3 with cold water which, in a preferred embodiment of the invention, contains an element for inhibiting the nuclear fission reaction, such as boron, in solution.

The level 3 divides the tank 2 into an upper part 4 and a lower part 5.

The depressurising system 1 also includes an ejector 6 and a condenser 7.

The ejector 6 has an inlet section 8, an outlet section 9 and a narrow section 10.

The condenser 7, preferably of the straight-tube type 30, has an inlet 11 and an outlet 12.

The nuclear reactor includes a pressuriser 13 filled with a volume of hot water 14 up to a level 15 and with a steam head 16 above the hot water 14.

The tank 2 is located above the entire pressuriser 13 and above the ejector 6 which in turn is located above the level 15 of hot water 14 in the pressuriser 13 while the condenser 7 is below the level 15.

The nuclear reactor also has a primary circuit of which the hot leg is indicated 17 in the drawings.

The steam head 16 communicates with the upper part 4 of the tank 2 through a first connector duct 18.

As a result, the tank 2 and the pressuriser 13 are at the same pressure.

A second connector duct 20 branches from the first duct 18 and is connected to the inlet section 8 of the ejector 6.

The outlet section 9 of the ejector 6 communicates with the inlet 11 of the condenser 7 through a third connector duct 21 while the outlet 12 communicates with the hot leg 17 through a first injector duct 22 which opens thereinto through a spray head 23.

The volume of hot water 14 in the pressuriser communicates through a fourth connector duct 19 with the hot leg 17 of the primary circuit.

The condenser 7 being below the level 15 of the water 14 within the pressuriser 13 and the circuit constituted by the succession of the third connector duct 21, the condenser 7, the first injector duct 22, the hot leg 17 and the fourth connector duct 19 being open, the result is that the condenser 7 is completely flooded with water from the pressuriser 13 which fills the entire circuit up to a point in the third connector duct 21 at the same height as the level 15.

The lower part 5 of the tank 2 is connected to the narrow section 10 of the ejector 6 by a delivery duct 24 which constitutes a syphon circuit.

The delivery duct 24 in fact has an ascending portion 24a, an upper portion 24b and a descending portion 24c which is connected into the narrow section 10.

The upper portion 24b is located above the tank 2 so that the cold water in the tank 2 fills the delivery duct 24 up to a point in the ascending portion 24a located at the same height as the level 3.

With reference in particular to FIG. 1, it may be seen that, when the level 15 in the pressuriser 13 falls as a result of an incident which causes a loss of water from the primary circuit, the water in the duct 21 also falls so as to uncover the tubes 30 in the condenser 7.

When this occurs, the condenser 7 starts to condense the steam filling it.

This phenomenon causes steam to be drawn from the pressuriser 13 through the first connector duct 18, the second connector duct 20, the ejector 6 and the third connector duct 21.

The passage of steam through the ejector 6 causes a drop in pressure in the narrow section 10.

This drop in pressure draws steam from the delivery duct 24 and thus also causes the water contained therein to rise into the upper portion 24b.

When this point is reached, the water in the tank 2 is injected simply by gravity through the delivery duct 24, the ejector 6, the third connector duct 21, the condenser 7 and the first injector duct 22 and is then sprayed from the spray head 23 into the hot leg 17 of the primary circuit.

Consequently the steam present condenses rapidly and causes depressurising of the nuclear reactor.

It is however possible to imagine numerous variants of the depressurising system 1 explained above.

Figure 2:
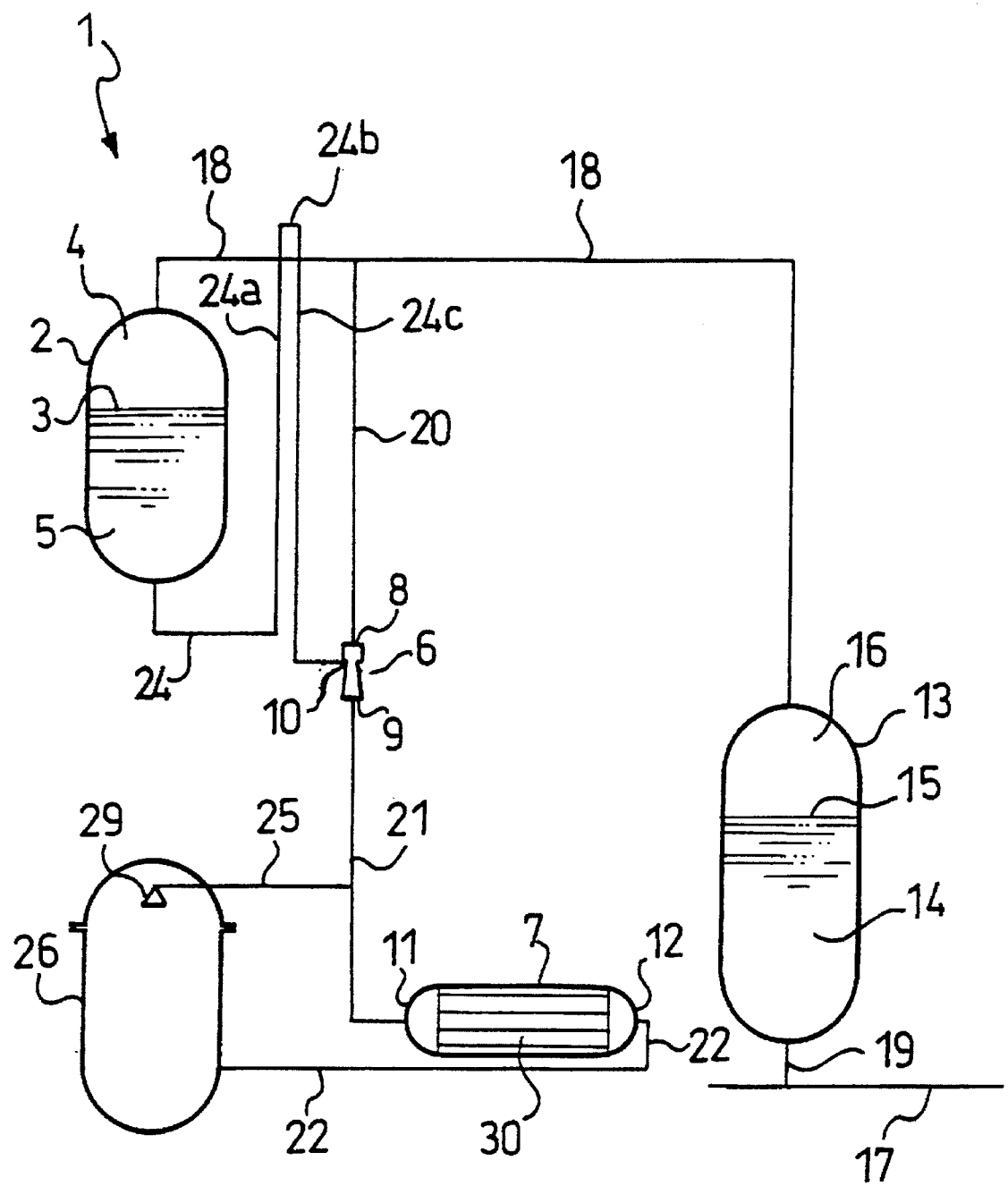
FIG. 2 is a schematic view of a different embodiment of the depressurising system of the invention.

With reference to FIG. 2, for example, a second injector duct 25 branches from the third connector duct 21 and opens into a pressure vessel 26 which contains the fuel elements of the nuclear reactor, thus constituting the heat source.

In this variant the first injector duct 22 also opens into the lower part of the pressure vessel 26.

In the event of an incident which makes rapid depressurising necessary, the system 1 operates in a manner similar to that described with reference to FIG. 1.

Some of the cold water in the tank 2 however flows through the condenser 7 and the first injector duct 22 and some flows through the third connector duct 21 to the second injector duct 25.

The quantity of water which flows through the ducts 22 and 25 may be predetermined by selection of the sections of the ducts 22 and 25.

In a preferred embodiment, the second injector duct 25 terminates in a spray head 29 within the pressure vessel 26.

Figure 3:
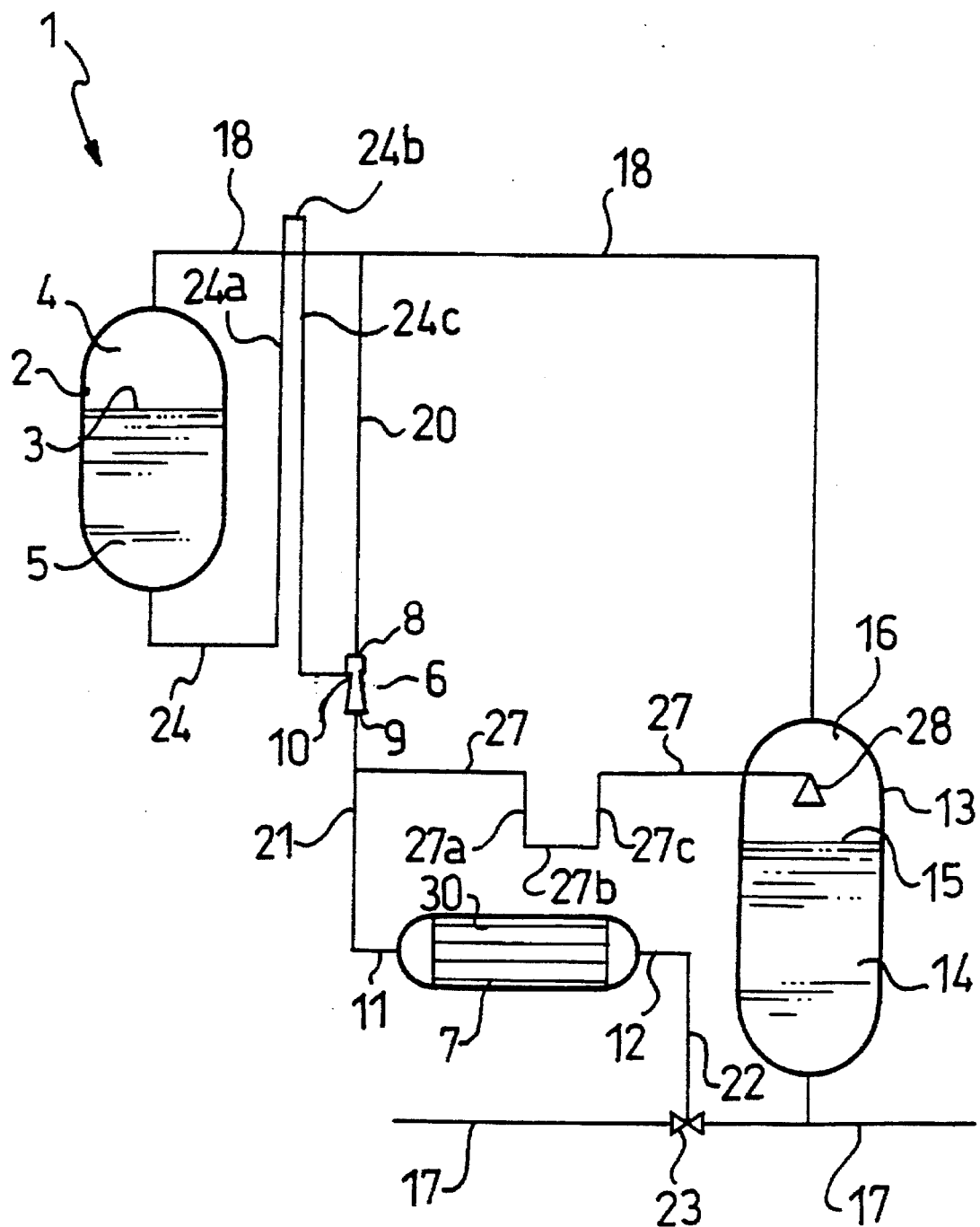
FIG. 3 is a schematic view of a further version of the depressurising system of the invention.

With reference to FIG. 3, a third injector duct 27 branches from the third connector duct 21 and includes a descending portion 27a, a lower portion 27b and an ascending portion 27c.

The third connector duct 27 opens into the steam head 16 of the pressuriser 13.

The portions 27a, 27b and 27c constitute an hydraulic seal, being full of water.

This prevents steam from circulating in the third injector duct 27 during the triggering of the depressurising system 1.

When the cold water is drawn from the tank 2, some of it flows through the condenser 7 and the first injector duct 22 and some through the third injector duct 27.

As in the depressurising system 1 described in FIG. 2, the quantities of water which flow through the ducts 22 and 27 may be predetermined by selection of the sections of the ducts 22 and 27.

In a preferred variant the third injector duct 27 terminates in a spray head 28.

Numerous variations and modifications may be made to the depressurising system 1 according to the invention all of which fall within the scope of protection of the inventive concept, as defined by the following claims.

We claim:

1. A depressurising system (1) for plants operating with pressurised steam and including a steam head (16), by injection of cold water under gravity from a reservoir (2) located at a position higher than the pressurised plant and having a delivery duct (24) for delivery to the pressurised plant, characterised in that it includes an ejector (6) which has an inlet section (8), an outlet section (9) and a narrow section (10), a condenser (7) which has an inlet (11) and an outlet (12), a first connector duct (18) which puts the reservoir (2) in communication with the steam head (16), a second connector duct (20) which puts the inlet section (8) of the ejector (6) in communication with the steam head (16), a third connector duct (21) which puts the outlet section (9) in communication with the inlet (11) of the condenser (7), a first injector duct (22) which puts the outlet (12) of the condenser (7) in communication with the pressurised plant, and in that the delivery duct (24) forms a syphon (24a, 24b, 24c), the reservoir (2) communicating with the pressurised plant through the delivery duct (24) and through the narrow section (10) of the ejector (6).

2. A depressurising system (1) according to claim 1, characterised in that the first injector duct (22) terminates in a spray head (23).

3. A depressurising system (1) according to claim 1, characterised in that it includes a second injector duct (25) which branches from the third connector duct (21) and opens into a pressure vessel (26) of the pressurised plant.

4. A depressurising system (1) according to claim 3, characterised in that the second injector duct terminates in a spray head (29) within the pressure vessel (26).

5. A depressurising system (1) according to claim 1, characterised in that it includes a third injector duct (27) which branches from the third connector duct (21) and which opens into the steam head (16) of the pressurised plant and in that the third injector duct (27) has a descending portion (27a), a lower portion (27b) and an ascending portion (27c).

6. A depressurising system (1) according to claim 5, characterised in that the third injector duct (27) terminates in a spray head (28) within the steam head (16).

* * * * *